United States Patent
Dinkla et al.

(10) Patent No.: US 11,934,419 B2
(45) Date of Patent: Mar. 19, 2024

(54) PRESENTATION OF SEARCH RESULTS IN A USER INTERFACE

(71) Applicant: International Business Machines Corporation, Armonk, NY (US)

(72) Inventors: Kasper Dinkla, Adliswil (CH); Michele Dolfi, Zurich (CH); Christoph Auer, Zurich (CH); Birgit Monika Pfitzmann, Wettswil (CH); Peter Willem Jan Staar, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 223 days.

(21) Appl. No.: 17/590,047

(22) Filed: Feb. 1, 2022

(65) Prior Publication Data
US 2023/0244682 A1    Aug. 3, 2023

(51) Int. Cl.
*G06F 16/00*  (2019.01)
*G06F 16/22*  (2019.01)
*G06F 16/248*  (2019.01)

(52) U.S. Cl.
CPC .......... *G06F 16/248* (2019.01); *G06F 16/221* (2019.01)

(58) Field of Classification Search
None
See application file for complete search history.

(56) References Cited

U.S. PATENT DOCUMENTS

| 7,461,077 B1 | 12/2008 | Greenwood |
| 2014/0372419 A1 | 12/2014 | Li |
| 2020/0097532 A1* | 3/2020 | Christianson ........... G06F 40/18 |
| 2021/0374331 A1* | 12/2021 | Schweizer ............ G06F 40/103 |

OTHER PUBLICATIONS

Iwata et al., "AspecTiles: tile-based visualization of diversified web search results", SIGIR'12, Aug. 12-16, 2012, Portland, Oregon, USA, Copyright 2012 ACM 978-1-4503-1472-5/12/08, 10 pps., <https://dl.acm.org/doi/abs/10.1145/2348283.2348298>.

Mell et al., "The NIST Definition of Cloud Computing", National Institute of Standards and Technology, U.S. Department of Commerce, NIST Special Publication 800-145, Sep. 2011, 7 pages.

(Continued)

*Primary Examiner* — Thu Nguyet T Le
(74) *Attorney, Agent, or Firm* — Aaron N. Pontikos

(57) ABSTRACT

The present disclosure relates to a method for displaying a search result in a user interface comprising a sequence of K table rows, a sequence of first type columns (named regular columns) and a sequence of B second type columns (named braided columns), the search result comprising values of attributes. The method includes creating a structure that includes a sequence table rows and a sequence of regular columns and a sequence of braided columns. The method selects a row of the sequence of rows and a braided column of the braided columns for displaying the search result. In each regular column a regular cell that is included in the selected row may be defined. From a braided column a braided cell may be defined that includes in the selected row and subsequent B−1 rows. The attributes values are displayed in the defined regular and braided cells.

20 Claims, 12 Drawing Sheets

(56) References Cited

OTHER PUBLICATIONS

Wan et al., "Combination of Partition Table and Grid Index in Large-Scale Spatial Database Query", The 1st International Conference on Information Science and Engineering (ICISE2009), 5 pps., <https://ieeexplore.ieee.org/abstract/document/5454439>.

Wiza et al., "Periscope: a system for adaptive 3D visualization of search results", Copyright © 2004 by the Association for Computing Machinery, Inc., 13 pps., @ 2004 ACM 1-58113-845-8/04/0004, <https://dl.acm.org/doi/abs/10.1145/985040.985045>.

* cited by examiner

PRESENTATION OF SEARCH RESULTS IN A USER INTERFACE

BACKGROUND

The present invention relates to the field of digital computer systems, and more specifically, to a method for presenting search results.

Tables may provide an efficient mean to display search results in tabular form. However, they have limitations in particular if the search results comprise heterogenous value formats.

SUMMARY

Various embodiments provide a method, computer system and computer program product as described by the subject matter of the independent claims. Advantageous embodiments are described in the dependent claims. Embodiments of the present invention can be freely combined with each other if they are not mutually exclusive.

In one aspect, the invention relates to a computer-implemented method for displaying a search result in a user interface (UI) by creation of a display structure comprising a sequence of K table rows, a sequence of first type columns (named regular columns) and a sequence of B second type columns (named braided columns), the search result comprising values of attributes. The method comprises:
- selecting a row of the sequence of rows and a braided column of the braided columns for the search result;
- defining in each regular column a regular cell that spans the selected row within the regular column, and defining a braided cell in the selected braided column that spans the selected row and subsequent B-1 rows;
- displaying the attributes values in the defined regular and braided cells.

In another aspect, the invention relates to a computer program product comprising a computer-readable storage medium having computer-readable program code embodied therewith, the computer-readable program code configured to implement all of the steps of the method according to preceding embodiments.

In another aspect, the invention relates to a computer system for displaying a search result in a user interface by creation of a display structure comprising a sequence of K table rows, a sequence of first type columns (named regular columns) and a sequence of B second type columns (named braided columns), the search result comprising values of attributes. The computer system is configured for:
- selecting a row of the sequence of rows and a braided column of the sequence of braided columns for the search result;
- defining in each regular column a regular cell that spans the selected row within the regular column, and defining a braided cell in the selected braided column that spans the selected row and subsequent B-1 rows;
- displaying the attributes values in the defined regular and braided cells.

BRIEF DESCRIPTION OF THE DRAWINGS

In the following, embodiments of the present invention are explained in greater detail, by way of example, making reference to the drawings in which.

DETAILED DESCRIPTION

Figure 1:
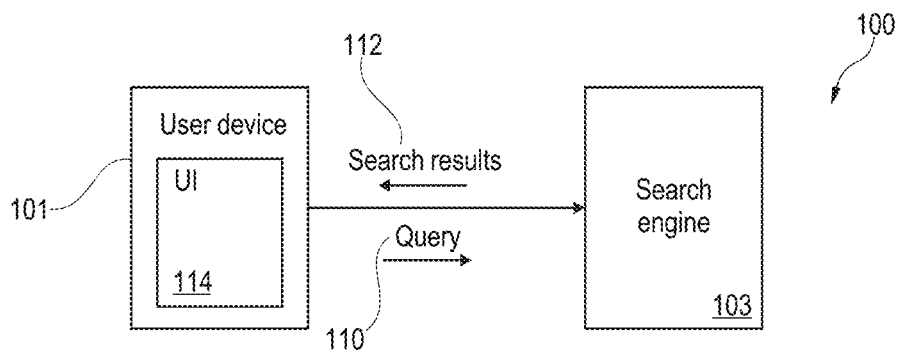
FIG. 1 is a block diagram of a computer system in accordance with an example of the present subject matter.

The descriptions of the various embodiments of the present invention will be presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

A search engine may be configured to provide one or more search results in response to a search query. The search engine may be configured to search requested content in one or more databases. The databases may comprise information about entities such as companies and users etc. The database may, for example, comprise a knowledge graph. The search engine may rank the search results. For example, the search engine may order the search results by relevance using scores. Each search result may comprise values of a set of attributes. The set of attributes may comprise J attributes $att_1, \ldots att_J$, where $J \geq 2$. The attribute may, for example, refer to a property of an entity. The attribute may be, for example, an image, a string, an integer value, a float value etc. The image may, for example, represent a person picture, a graph, etc. The attribute may have a width labelled as "attribute width" and height labelled as "attribute height".

The attribute widths and heights may vary depending on the type of the attribute values. For example, an image may have a higher attribute width and attribute height compared to a float value. The search result may have a heterogenous format of attribute values. This may render the presentation of the search result a technically challenging task because a non-optimal presentation of the search result may obstruct its legibility for the user. The present subject matter (i.e., embodiments of the present invention), may solve this issue by optimizing the presentation of the search result using different sizes, wherein the attribute values are positioned so that they do not obstruct the focus of the user. To achieve an optimized presentation of a search result, a table configuration display structure may be used, such that the table configuration defines a table with different types of columns, the regular columns and the braided columns, both of which intersect table rows. The table configuration may further define the position of the table within a user interface. The table structure may comprise a sequence of rows, a number "R" of regular columns and a number B of braided columns, where R and B are integer numbers, (e.g., $B \geq 1$ and $R \geq 1$). The number R of regular columns may be defined based on the number of attribute values in the search results. For example, the number of regular columns may be smaller than or equal to J−1, $R \leq J-1$, where J is the number of attribute values as described above. The number B of braided columns may be defined based on at least one of: the number of search results to be presented and the available space in the user interface. Each row may have a row height.

A table cell may be a grouping within the table used for storing one or more attribute values. The table cell may be a regular cell if it belongs to a regular column. The table cell may be a braided cell if it belongs to a braided column. The regular cell may span one row of the table within the regular column. The braided cell may span a number B of rows, where B is the number of braided columns as described above. For example, in order to display the search result (referred to as $SR_N$), a $z^{th}$ row of the table and a $x^{th}$ braided column of the table may be selected. The selection of the row and the braided column implies a selection of a specific position within the user interface where the search result may be displayed. In each regular column i, a regular cell (referred to as $Cell_{reg\_i}^{SR_N}$) may span the selected row, and in the selected braided column a braided cell (referred to as $Cell_{braid\_x}^{SR_N}$) may span the selected row and subsequent B−1 rows (for a total of braided cells spanning B rows). The attributes values of the search result $SR_N$ may be displayed in the corresponding regular and braided cells $Cell_{reg\_i}^{SR_N}$ and $Cell_{braid\_x}^{SR_N}$ (where i varies between 1 and the number of regular columns).

The present subject matter may be advantageous as it may align the regular and braided cells of a given search result. Alignment can create order between attribute values. Additionally using different cell sizes may drive users' attention and guide the user reading. The selection of a specific row and a specific braided column may keep the dense linear ordering of tables but give special treatment to values that require large area and low aspect ratio visualizations. The way the information is presented may affect the observation, recognition, and retention of the information by the user. The search result may, for example, be displayed on a screen near the user's current visual focus of attention so that the association of the attribute values is seen immediately as compared to a separate placement of the attribute values, for example, placement on different user interfaces (UIs). Using the table with only regular cells may not effectively display search result data that requires a large area and low aspect ratio, such as images, without oversizing the row height and thus losing the above advantages. Thus, the present subject matter may provide a clear linear ordering with perceptual benefits and ways to present data requiring a larger display area and low aspect ratio.

The selection of the $z^{th}$ row of the sequence of rows that can be used for displaying the search result $SR_N$ may be a challenging task in particular in case the search result $SR_N$ to be displayed is one of a sequence of search results. First, there may be a need for a systematic method for choosing the row where the search result can be displayed. Second, the selected row position may need to reflect the order of the search result so that the user has better focus and following of the search results. This may particularly be relevant if the search results are ranked and/or displayed one by one and one after the other following their order. The search result $SR_N$ may be the $N^{th}$ search result of a sequence of S search results, where S is an integer number higher than one. Thus, according to one embodiment, the selected row is the $N^{th}$ row (i.e., z=N) of the sequence of rows and the selected $x^{th}$ braided column of the sequence of the braided columns, where x=1+((N−1) mod B), where mod is a modulo operation.

The present subject matter may enable the display of all the ranked search results at once in the user interface. According to one embodiment, the method may be repeated for each search result $SR_1$ of the sequence of search results, based on the above column selection formula, thereby displaying the search results in the user interface in which j varies between 1 and the number of search results S. The present subject matter may be advantageous as it may make more content available at one time on a user interface, such as displaying more content on-screen. Increasing the density of displayed information facilitates scanning, viewing, and comparing information. Also, UIs that include dense displays of information may help users focus by reducing the space between search results.

An alternative method to systematically display the sequence of search results may be provided by iteratively processing the sequence of search results. According to one embodiment, the method further comprises: repeating the method for each next search result of the sequence of search results, wherein the braided column of a current search result has an order $n_0$ in the sequence of the braided columns, where $n_0$ is equal to the order $n_{-1}$ of the braided column of the preceding search result plus one if $n_{-1} < B$, otherwise $n_0 = 1$.

According to one embodiment, in cases in which the selected row is the $n^{th}$ row of the K rows and $n \leq B$, the method further comprises defining n−1 padding cells, wherein each padding cell spans one row of the first n−1 rows. The padding cell of a given row may, for example, be used to display further data of the search result associated with said row. In another example, the padding cell may be used to help in distinguishing the different displayed rows.

According to one embodiment, the method further comprises defining the braided columns by: determining a maximum ratio $$R = \frac{w_{att}}{h_{att}}$$

of all attribute values of the search results, where $w_{att}$ is the width of an attribute value and $h_{att}$ is the height of the attribute value; setting the width $w_{bcol}$ of each braided column to $w_{bcol} = R \times h_{row}$ where $h_{row}$ is the row height; defining the number B as follows:

$$B = \frac{W}{w_{bcol}}$$

where W is a canvas width, and a canvas is a container that holds various image/drawing elements.

The attribute width and attribute height of a given attribute may refer to the width and height of the display/depiction of the given attribute respectively. The set width $w_{bcol}$ may tightly fit a column cell around a search result attribute visualization with a worst possible ratio, or a maximum ratio. For example, the search results may be displayed on the canvas in a user interface. The example embodiment may enable filling up the available canvas width with as many parallel braids as possible or tolerated, thus increasing search result visualizations.

According to one embodiment, the method further comprises defining the braided columns such that the number of braided columns, B, is smaller than a predefined maximum number, and the width $w_{bcol}$ of each braided column is smaller than a predefined maximum width.

According to one embodiment, the method further comprises providing the number B, the row height $h_{row}$ and the width $w_{bcol}$ as configuration parameters, and receiving values of the configuration parameters from a user's client device for performing the method. The configuration parameters may further comprise the number of rows. The configuration parameters may be received as a definition of the table from which the present method may create new braided rows.

According to one embodiment, the method further comprises: assigning each attribute value of the search result to a cell of the defined regular and braided cells, wherein the assigning is performed based on at least one of: the ratio $$r = \frac{w_{att}}{h_{att}},$$

where $w_{att}$ is the width of an attribute value and $h_{att}$ is the height of the attribute value; area covered by the attribute; and the type of the attribute value.

Figure 8:
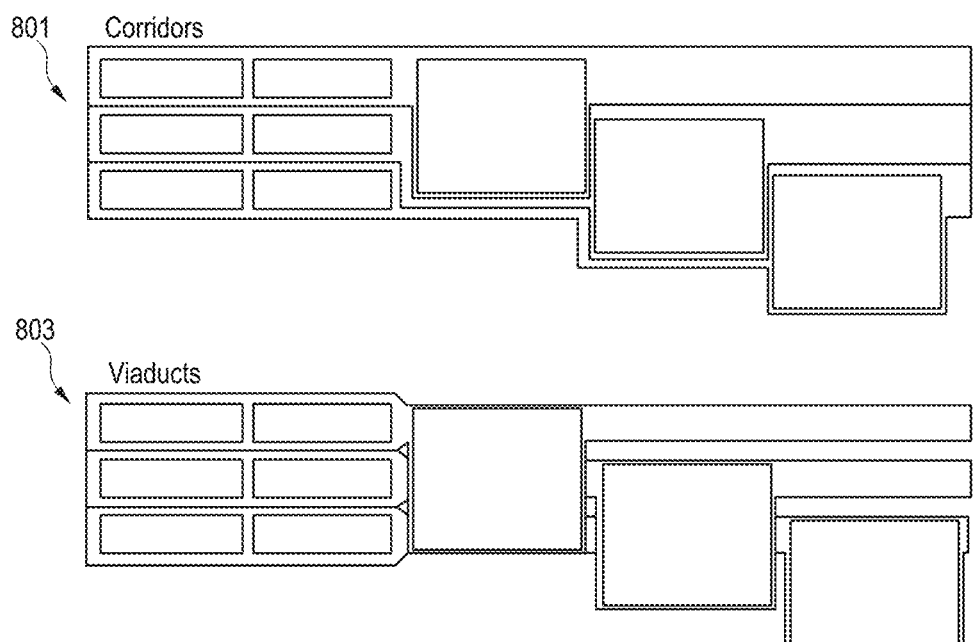
FIG. 8 shows example table configurations in accordance with an example of the present subject matter.

According to one embodiment, the method further comprises: displaying around the regular and braided cells of the search result a delimiting line which is not overlapping with other delimiting lines of the other search results. An example implementation of this embodiment is shown in FIG. 8.

According to one embodiment, the method further comprises providing a HTML code, wherein the execution of the HTML code causes the display of the attribute values.

According to one embodiment, the method further comprises querying a database, such as a knowledge graph, and receiving the search result. The knowledge graph may be a graph. A graph may refer to a property graph where data values are stored as properties on nodes and edges. Property graphs may be managed and processed by a graph database management system or other database systems which provide a wrapper layer converting the property graph to, for example, relational tables for storage and convert relational tables back to property graphs when read or queried. The graph may, for example, be a directed graph. The graph may be a collection of nodes (also referred to as vertices) and edges.

According to one embodiment, the attribute values comprise one image and non-image values, wherein the image is displayed on the braided cell and the other attribute values are displayed on the regular cells.

FIG. 1 illustrates a computer system 100 in accordance with an example of the present subject matter. The computer system 100 may comprise a user device 101 and search engine 103. The user device 101 is configured to connect to the search engine via a network connection which comprises, for example, a wireless local area network (WLAN) connection, WAN (Wide Area Network) connection, LAN (Local Area Network) connection the internet or a combination thereof. The user device 101 may be configured to send queries 110 to the search engine 103. In response to the query, the search engine 103 may provide search results 112. The user device 101 may be configured to display the search results 112 on a user interface 114 of the user device 101 in accordance with the present subject matter. The user interface 114 as shown in FIG. 2B may display a table with a sequence of rows.

Figure 2A:
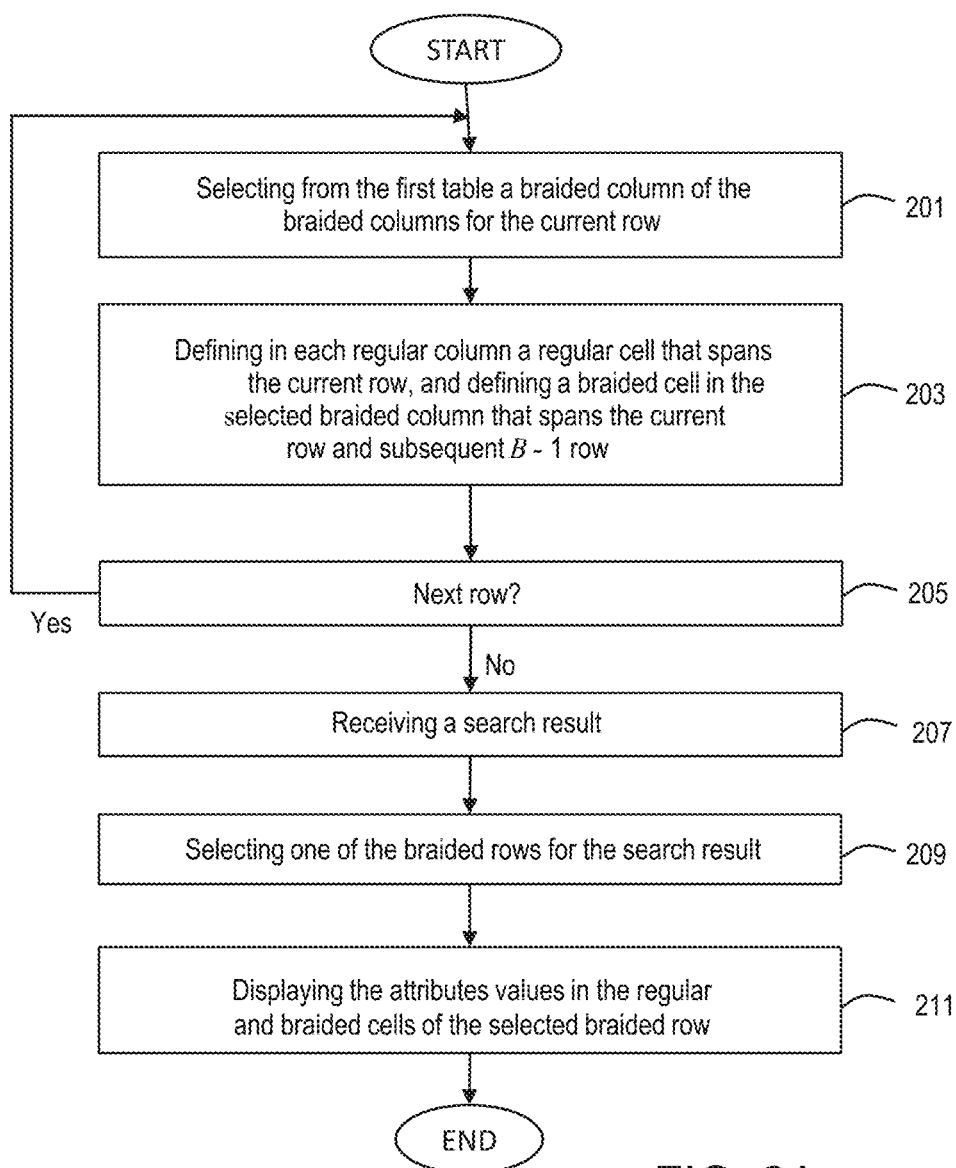
FIG. 2A is a flowchart of a method for displaying a search result in accordance with an example of the present subject matter.

FIG. 2A is a flowchart of a method for displaying a search result in accordance with an example of the present subject matter. For the purpose of explanation, the method described in FIG. 2A may be implemented in the system illustrated in FIG. 1 but is not limited to this implementation. The method of FIG. 2A may, for example, be performed by the user device 101.

Figure 2B:
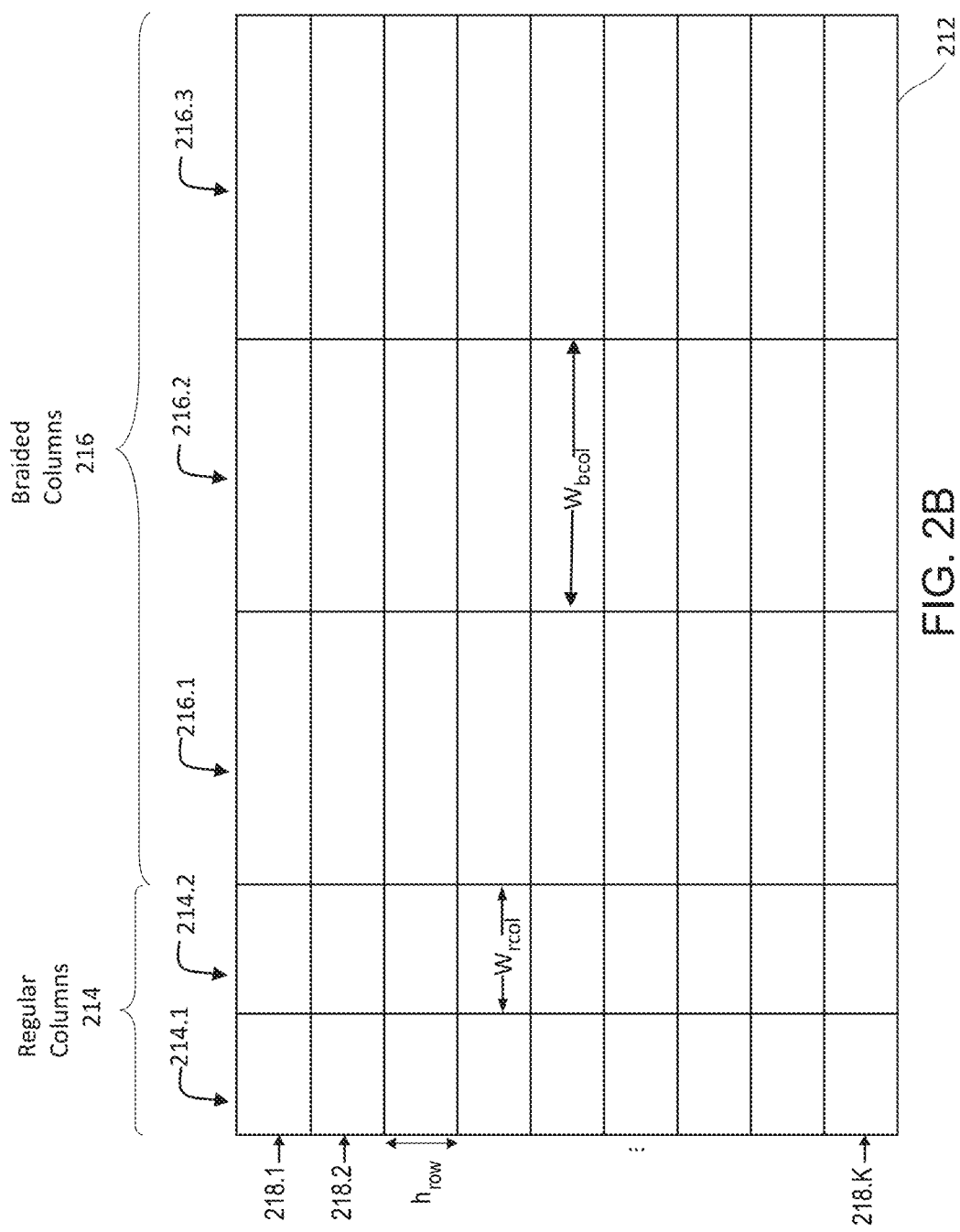
FIG. 2B depicts the table configuration according to an example of the present subject matter.

A first table 212 as shown in FIG. 2B may consist of an ordered arrangement of regular columns 214 followed by a sequence of B braided columns 216.1, 216.2 and 216.3. The number of braided columns B is set to three in FIG. 2B for simplification of the description, but the number of braided columns is not limited and may be set to more or fewer braided columns used with the present subject matter. The number of regular columns R is set to two in FIG. 2B for simplification of the description but is not limited and may be set to more or fewer regular columns used with the present subject matter. The braided columns may collectively be referenced by 216. The regular columns 214 comprise two regular columns 214.1 and 214.2. The braided column has a width $w_{bcol}$ larger than the width $w_{rcol}$ of the regular column. Each column of the first table 212 comprises rows (regular rows) 218.1-K. The number K of rows may, for example, be predefined. In another example, the number K of rows may dynamically be determined, for example, it may be determined based on the number of search results to be displayed so that the number K of rows may be higher than or equal to the number of search results. Each regular row (218.i) may have a row height $h_{row}$. The row height $h_{row}$ of each regular row in the first table 212 may be the same. Each regular row (218.i) may be a first series of cells arranged horizontally in the first table. Each cell of the series of cells may span the space of intersection between a column and a regular row (i.e., row 218i/column 214i). The first table 212 may be provided as input to the present method. The first table 212 may, for example, be provided as metadata (or configuration data) that describes the properties of the first table as described above and its position within the user interface 114.

For each regular row 218.i of the first table 212 (where i varies between 1 and the number K of braided rows), steps 201 to 203 may be performed in order to create a respective modified row 228.i named braided row. Inquiry step 205 may be used to check whether there is a remaining non-processed regular row in order to repeat steps 201 to 203. For example, the regular rows may be processed following their order from top to bottom starting from regular row 218.1, followed by regular row 218.2 etc. and the regular row 218.K may be the last to be processed. An $x^{th}$ braided column 216.x of the braided columns 216 that corresponds to the current regular row 218.i may be selected in step 201, where x can be a value between 1 and the number B of braided columns. For example, for the first regular row 218.1, the first braided column 216.1 may be selected (i.e., x=1), for the third regular row 218.3, the third braided column 216.3 may be selected (i.e., x=3).

Figure 2C:
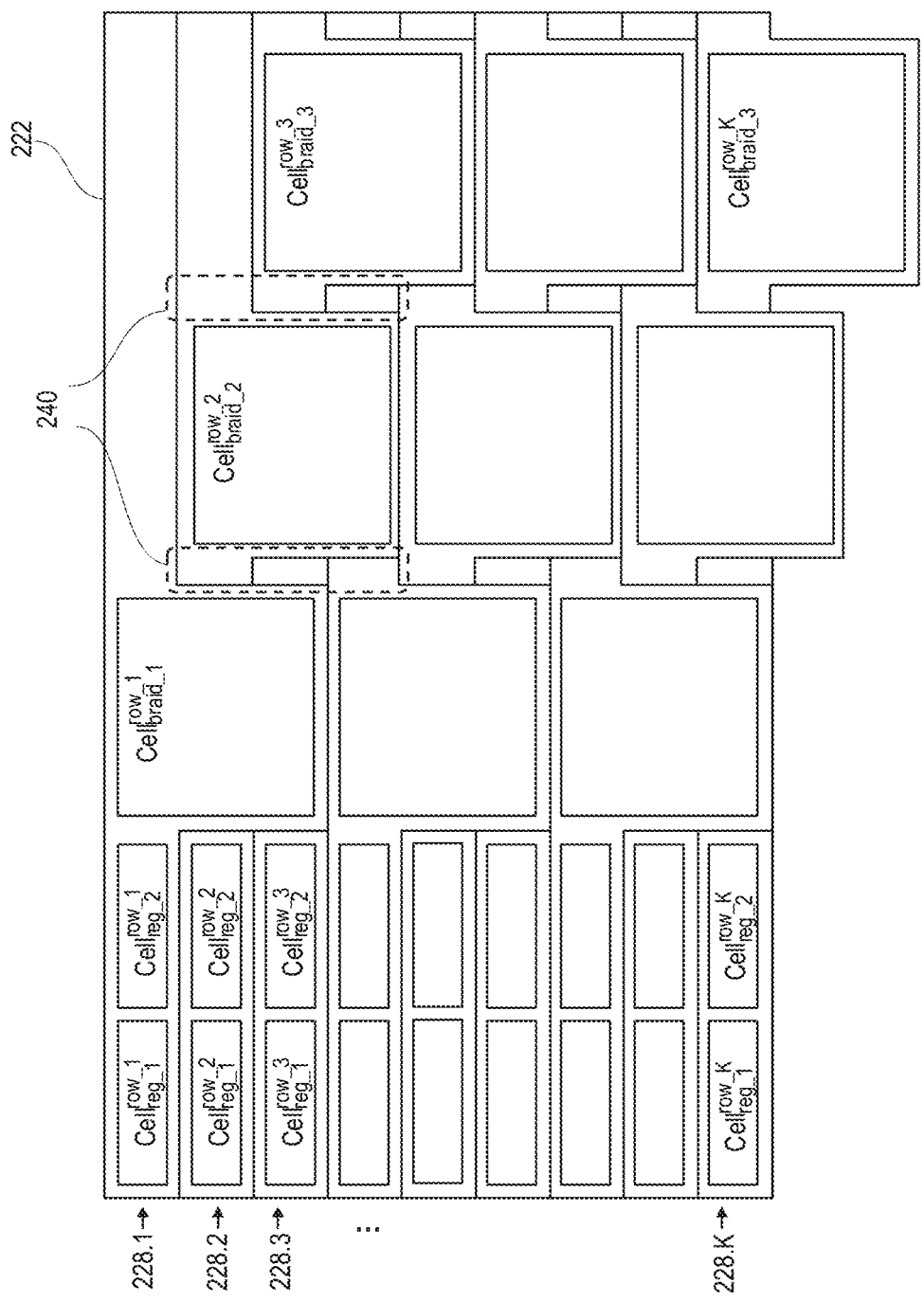
FIG. 2C depicts the table according to an example of the present subject matter.

A second series of cells may be defined in step 203 for a braided row 228.i based on the current regular row 218.i. The second series of cells comprises one cell, named regular cell, per regular column 214.1 and 214.2. The regular cell may be referred to as $Cell_{reg\_j}^{row\_i}$, where reg_j indicates the $j^{th}$ regular column, and row_i indicates the $i^{th}$ braided row, where j varies between 1 and the number R of regular columns. The cell $Cell_{reg\_j}^{row\_i}$ may occupy the intersection area between the regular column reg_j and the braided row row_i, shown in FIG. 2C, where the two regular cells occupy the intersection areas of the regular row with the regular columns 214. Thus, the regular cells $Cell_{reg\_j}^{row\_i}$ span one regular row, which is the current regular row 218.i. One additional cell, named braided cell, may be defined in the selected braided column such that the braided cell spans the current regular row 218.i and the subsequent B−1=2 regular rows. The braided cell may be referred to as $Cell_{braid\_x}^{row\_i}$, where braid_x indicates the selected $x^{th}$ braided column, and row_i indicates the $i^{th}$ braided row. The second series of cells comprises R regular cells and one braided cell. The second series of cells is different from the first series of cells of the currently processed regular row. This may define a new braided row 228.i having the second series of cells as shown in FIG. 2C. Thus, the processing of the regular rows 218.1-K of the first table 212 results in a second table 222 as shown in FIG. 2C having the braided rows 228.1-K. The second table 222 has the same columns as the first table. Each braided row 228.i is a second series of cells put out horizontally in the second table 222. Each of the braided cells may optionally be provided with an area 240 on its right and left sides. For simplification of the drawings, these areas 240 are only shown for one braided cell. Each of the areas 240 may comprise a number B of small compartments, each compartment having closed and/or open sides and it is along a respective regular row that is spanned by the braided cell. The compartments may style the borders to create the braid effect and better distinguish the braided rows. FIG. 8 provides alternative structures.

The layout of braided columns 216 may be affected by three parameters that can be set up front, the row span, the width, and the height. The row span (or B) may be equal to the number of braids that are placed in parallel, the width may only be constrained by available space, and the height is equal to the row height times the row span. For example, upon hovering a cell, control points can be shown that change braid width, height, and row span when dragged. The row span snaps in place according to valid row intervals.

Figure 2D:
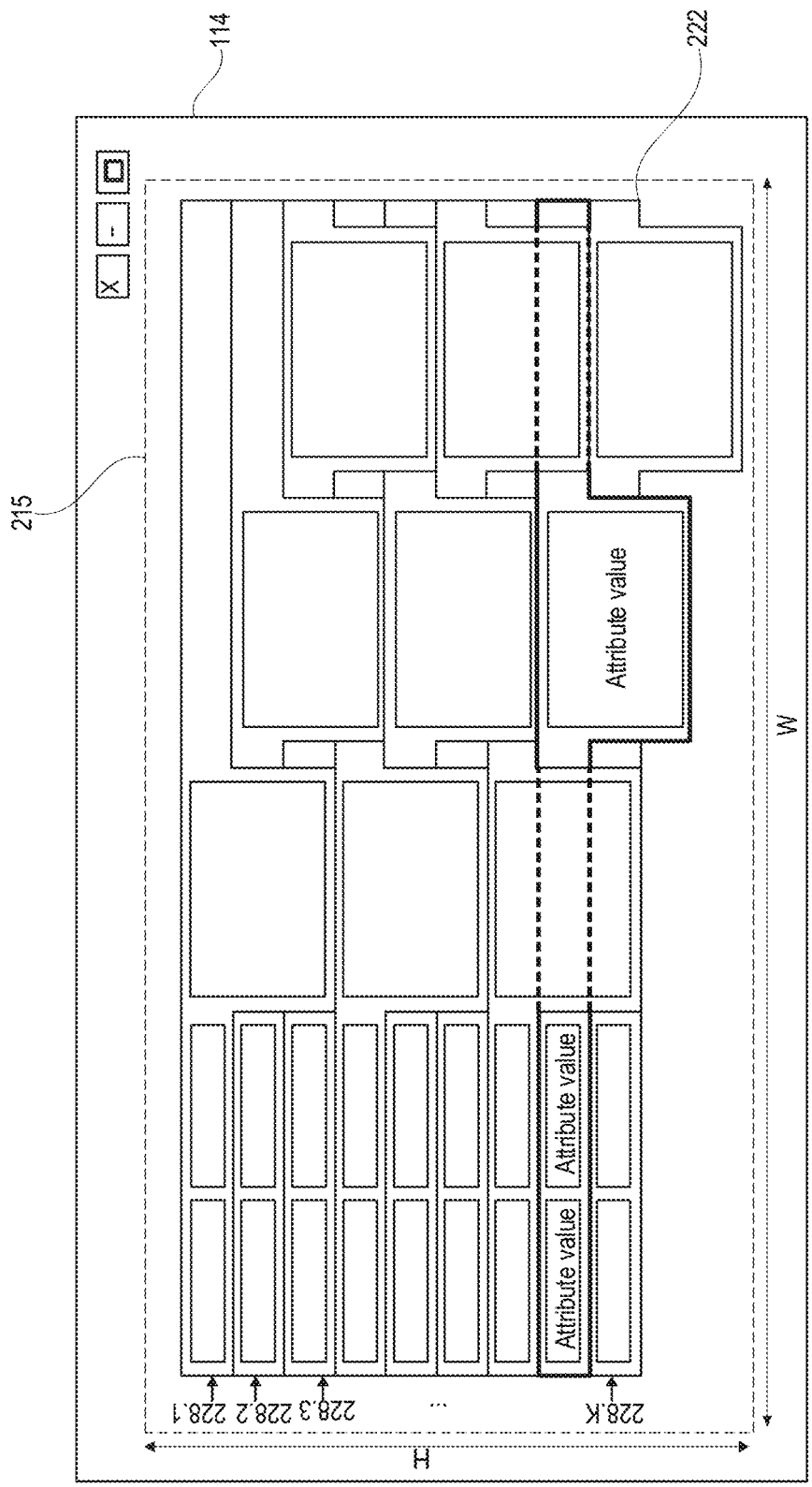
FIG. 2D depicts the displayed table according to an example of the present subject matter.

Steps 201-205 may be executed independently of the remaining steps 207 to 211 of the method in order to prepare the second table 222. For example, steps 201 to 205 define a preparation method for preparing the second table 222. The remaining steps 207 to 211 define the method for displaying the search result(s) on the second table 222. Indeed, the second table 222 may advantageously be used according to the present subject matter in order to display search results. For example, upon receiving a search result in step 207, one braided row 228.z of the braided rows 218.1-K of the second table 222 may be selected in step 209, where z may be an integer value between 1 and K. The selected braided row 228.z has R regular cells and one braided cell. The attribute values of the search result may be displayed in step 211 in the second series of cells of the selected braided row 228.z respectively. The second table 222 may be displayed in a canvas 215 of the user interface 114. The canvas 215 may have width W and height H. FIG. 2D shows that the (K−1)' braided row is the selected braided row (i.e., z=K−1 in this case), and the attribute values are displayed in the second series of cells of the (K−1)' braided row. The second table 222 may be displayed in a canvas that is larger than the physical display area by making the canvas scrollable. This may enable the display of larger tables. In one example, the second table 222 may be implemented as a virtual canvas which starts empty and which can grow right and down as needed making use of the scrolling. Thus, the attribute values may seamlessly be brought into the second series of cells, giving the illusion of a larger virtual space.

The new table 222 may enable maintaining the dense linear ordering at the cost of extra table width. Low aspect ratio visualizations can be placed, in context of their search result row. The rows may be partially occluded but still appear as though they are whole (e.g., predictable shapes may be inferred to continue when occluded, if an occluding shape clearly appears in front of the occluded shape). The present method may provide a way to show ranked (or sorted) search results, which still has the dense linear ordering of tables and can also visualize values that require large area and a low aspect ratio.

Figure 3A:
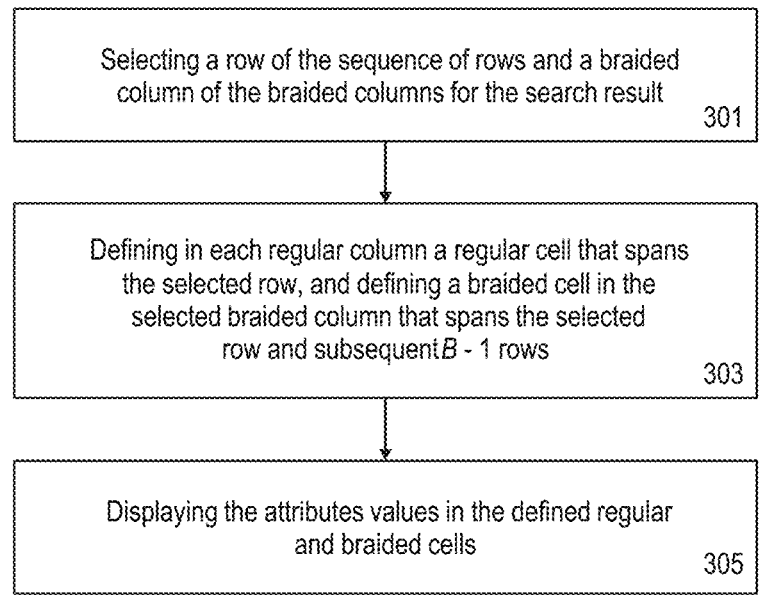
FIG. 3A is a flowchart of a method for displaying a search result in accordance with an example of the present subject matter.

FIG. 3A is a flowchart of a method for displaying a search result in accordance with an example of the present subject matter. For the purpose of explanation, the method described in FIG. 3A may be implemented in the system illustrated in FIG. 1 but is not limited to this implementation. The method of FIG. 3A may, for example, be performed by the user device 101. The method of FIG. 3A may provide an alternative to the application method (having steps 207 to 211) defined in FIG. 2A.

Figure 3B:
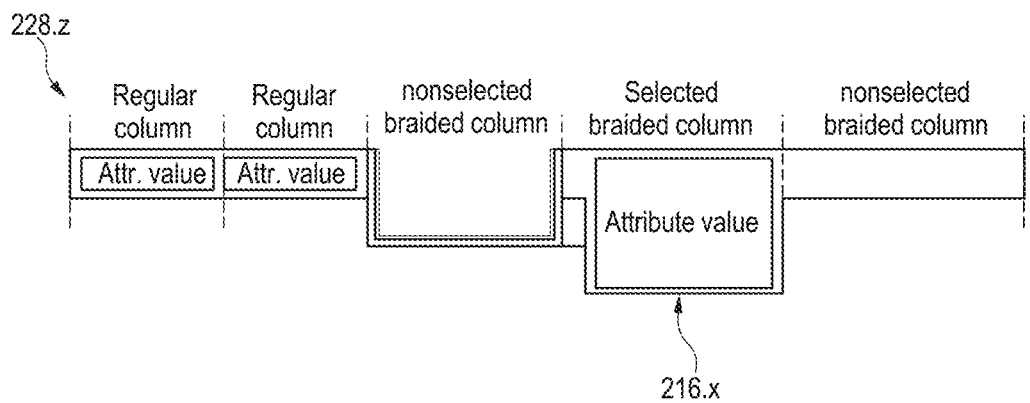
FIG. 3B depicts a displayed braided row in accordance with an example of the present subject matter.

The method of FIG. 3A may receive as input the first table 212 as described in FIG. 2B. A table configuration descriptive of the first table 212 may, for example, be received as input for the present method. The table configuration may indicate the row height, the number, and the width of the regular and braided columns. A $z^{th}$ regular row of the sequence of rows of the first table 212 may be selected in step 301 for the search result. An $x^{th}$ braided column of the braided columns 216 of the first table 212 table may be selected for the search result. In each regular column of the $z^{th}$ regular row, a regular cell that spans the selected regular row may be defined in step 303. In addition, a braided cell may be defined in the selected braided column so that the braided cell spans the selected row and subsequent B−1 rows may be defined in step 303. The attribute values of the search result may be displayed in step 305 in the defined regular and braided cells. This is shown in FIG. 3B, where one braided row 228.z is shown, with the attribute values being displayed in the second series of cells of the braided row 228.z. The method of FIG. 3A may be advantageous as it creates the braided row on demand and not upfront. That is, the braided rows are only created for the received search results.

Figure 4A:
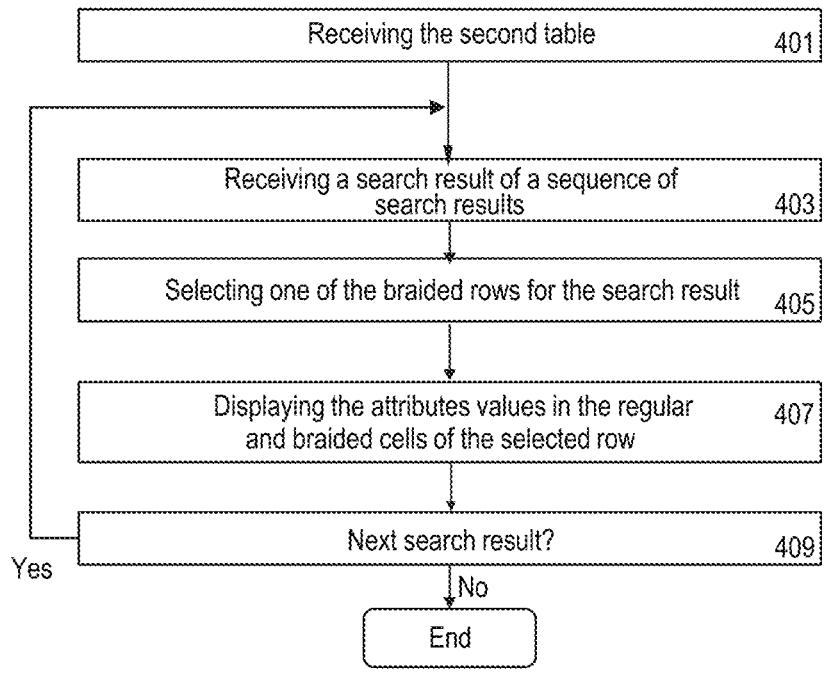
FIG. 4A is a flowchart of a method for displaying a sequence of search results in accordance with an example of the present subject matter.

FIG. 4A is a flowchart of a method for displaying a sequence of search results in accordance with an example of the present subject matter. For the purpose of explanation, the method described in FIG. 4A may be implemented in the system illustrated in FIG. 1 but is not limited to this implementation. The method of FIG. 4A may, for example, be performed by the user device 101. The method of FIG. 4A may repeat the application method on a sequence of search results. The number of search results may be smaller than or equal to the number of rows K.

Figure 4B:
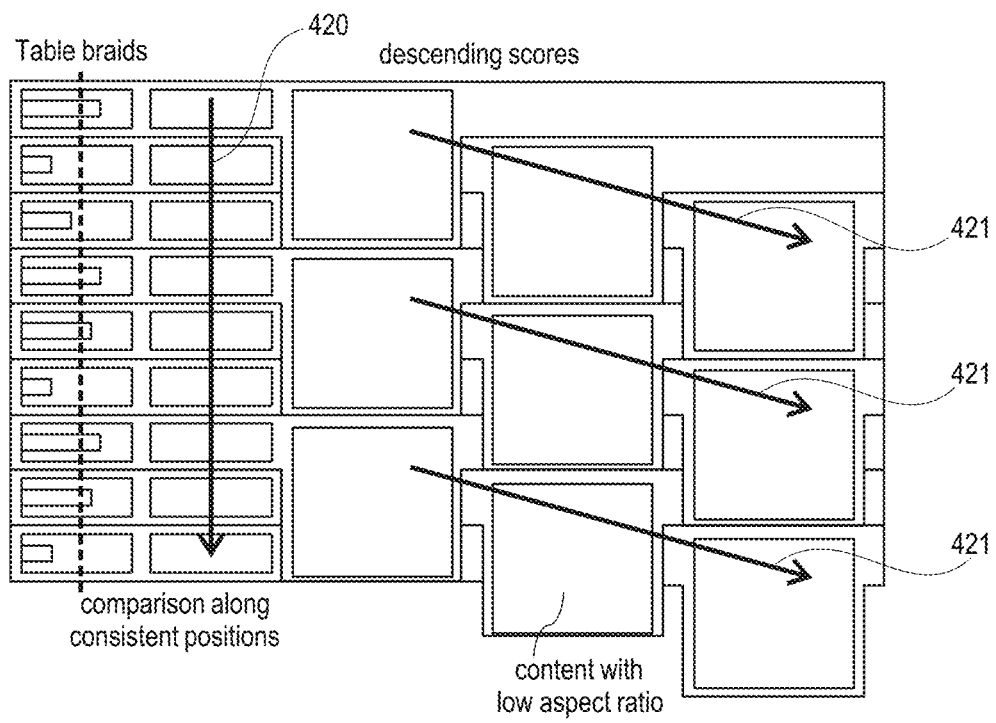
FIG. 4B illustrates the method of selection of the rows based on the order of search results.

In step 401, the second table 222 may be received. For each search result of a sequence of search results, steps 403 to 407 may be performed. For that, inquiry step 409 may be used to check whether there is a remaining non-processed search result in order to repeat steps 403 to 407. Upon receiving a current $N^{th}$ search result of the sequence of search results in step 403, one $z^{th}$ braided row 228.z of the braided rows 228.1-K of the second table 222 may be selected in step 405, where z may be an integer value between 1 and K. The selected braided row 228.z of table 222 has two regular cells and one braided cell. The selection of the braided row in step 405 may, for example, be performed as indicated by the arrow 420 in FIG. 4B. Indeed, the search results may be ranked in a descending order of the scores assigned to the search results. The selected braided row may, for example, have the same order as the order of the current search result (i.e., N=z), such that the first braided row may be selected for the first search result, the second braided row may be selected for the second search result, and so on. The attribute values of the search result may be displayed in step 407 in the second series of cells of the selected braided row 228.z respectively. The arrows 421 in FIG. 4B indicate how the search results are displayed on the braided columns based on the scores but also based on the number B of the braided columns. The first braided column may be selected for the first search result, the second braided column may be selected for the second search result, the third braided column may be selected for the third search result; however, the first braided column may be selected again for the fourth search result because the number B of the braided columns is smaller than 4, B<4. The method of FIG. 4A may enable the display all the search results in the second table 222.

Figure 5A:
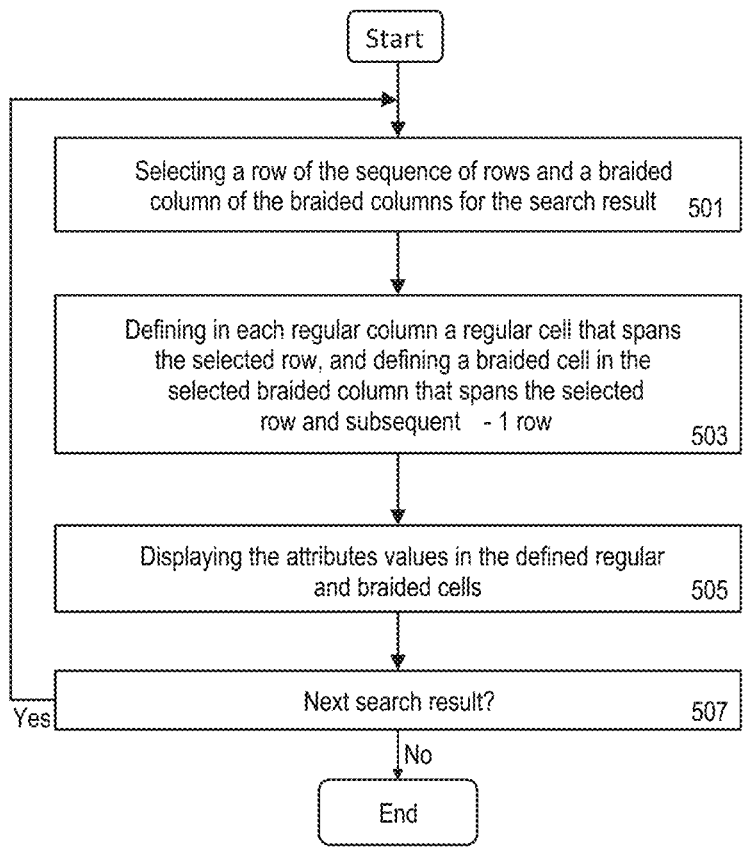
FIG. 5A is a flowchart of a method for displaying a sequence of search results in accordance with an example of the present subject matter.

FIG. 5A is a flowchart of a method for displaying a sequence of search results in accordance with an example of the present subject matter. For the purpose of explanation, the method described in FIG. 5A may be implemented in the system illustrated in FIG. 1 but is not limited to this implementation. The method of FIG. 5A may, for example, be performed by the user device 101. The method of FIG. 5A may provide an alternative to the method of FIG. 4A. The method of FIG. 5A may be advantageous as it creates the braided row on demand and not upfront, such that the braided rows are only created for the received search results. The number of search results may be smaller than or equal to the number of rows K.

By contrast to the method of FIG. 4A, the method of FIG. 5A may receive as input the first table 212 as described in FIG. 2B (instead of second table 222). A table configuration descriptive of the first table 212 may, for example, be received as input for the present method. The table configuration may indicate the row height, the number, and the width of the regular and braided columns. For each search result of a sequence of search results, steps 501 to 505 may be performed, and inquiry step 507 may be used to check whether there is a remaining non-processed search result in order to repeat steps 501 to 505. For a current $N^{th}$ search result of the sequence of search results, a $z^{th}$ regular row of the sequence of rows of the first table 212 is selected in step 501. A $x^{th}$ braided column of the braided columns 216 of the first table 212 table is also selected in step 501 for the current $N^{th}$ search result.

Figure 5B:
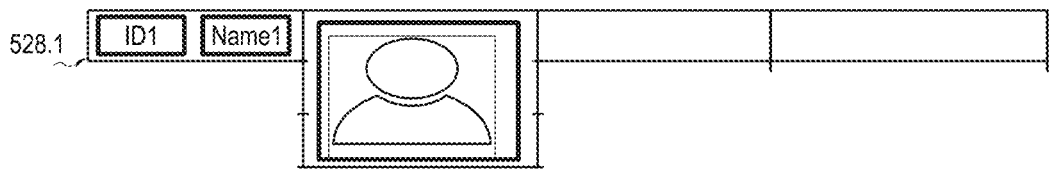
FIG. 5B depicts the displayed braided rows in accordance with an example of the present subject matter.
Figure 5C:
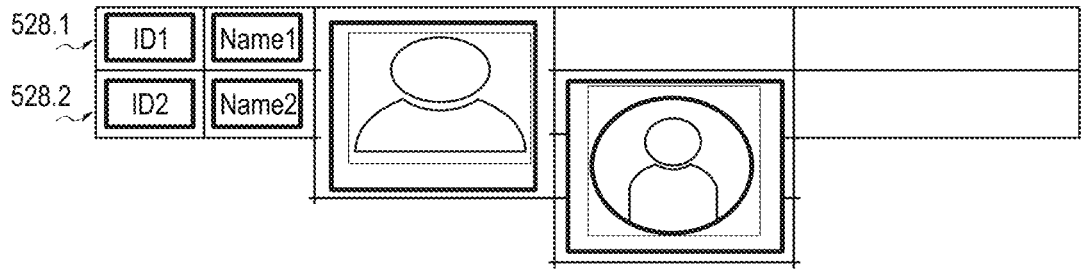
FIG. 5C depicts the displayed braided rows in accordance with an example of the present subject matter.
Figure 5D:
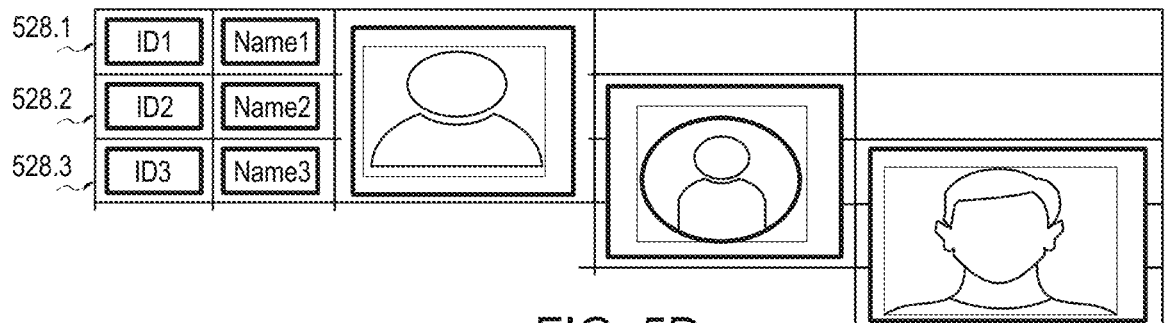
FIG. 5D depicts the displayed braided rows in accordance with an example of the present subject matter.
Figure 5E:
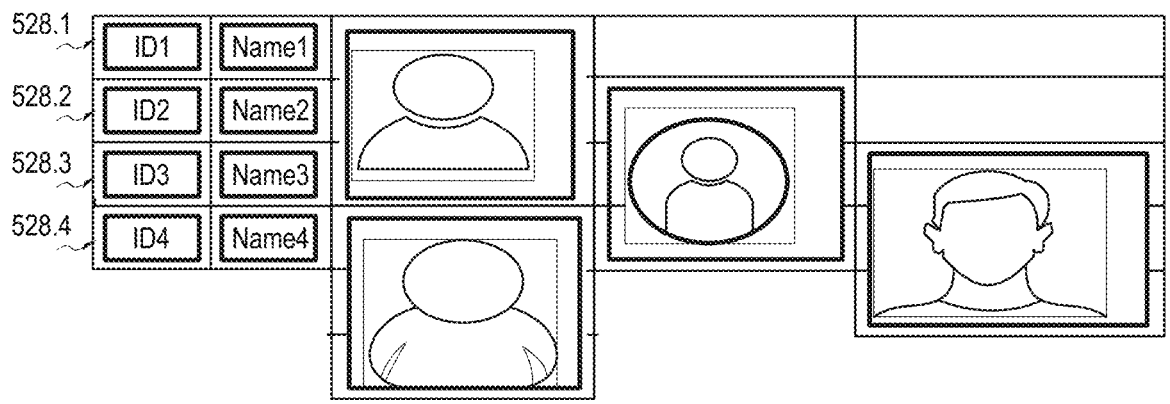
FIG. 5E depicts the displayed braided rows in accordance with an example of the present subject matter.

In each regular column, a regular cell that spans the selected regular row (i.e., for the respective regular column), may be defined in step 503, and a braided cell in the selected $x^{th}$ braided column that spans the selected current $z^{th}$ regular row and subsequent B−1 rows may also be defined in step 503 (i.e., the braided cell includes the selected row and additional rows, based on the number of braided columns, B). This may define a $z^{th}$ braided row having the defined regular and braided cells. The attributes values of the current $N^{th}$ search result may be displayed in step 505 in the defined regular and braided cells. FIGS. 5B-E show the progressive result of processing the first four search results. For example, the second table may be implemented as a virtual canvas which starts as empty and which can grow right and down as needed as illustrated in FIGS. 5B-E. The first search result may be displayed in the first braided row 528.1 as shown in FIG. 5B. FIG. 5C shows the display of the first two search results in the first braided rows 528.1 and 528.2 respectively. FIG. 5D shows the display of the first three search results in the first braided rows 528.1, 528.2 and 528.3 respectively. FIG. 5E shows the display of the first four search results in the first braided rows 528.1, 528.2, 528.2, and 528.4 respectively. As shown in FIGS. 5B-E, each search result represents attributes of a user in which the search result includes the attribute values of the respective user's name, ID, and a picture of the user. For example, the fact that the ID, name, and the picture of a single user are vertically aligned (i.e., top of regular and braided cells are aligned) may enable to distinguish the data of the different users while providing a dense and compact presentations that may display a high number of results. The dense linear ordering of tables is maintained but special treatment is given to the user picture that may require large area and low aspect ratio visualization.

The selected $x^{th}$ braided column of the sequence of the braided columns in the previous FIGS. 2A to 5A may, for example, be defined as follows x=1+((N−1) mod B), where mod is a modulo operation. This may be advantageous in case the sequence of search results is processed in any order. In case the search results are processed successively following their order, the selected braided column of the sequence of the braided columns may be provided as follows. The braided column of a current search result has an order $n_0$ in the sequence of the braided columns, where $n_0$ is equal to the order $n_{-1}$ of the braided column of the preceding search result plus one if $n_{-1}<B$, otherwise $n_0=1$.

Figure 6A:
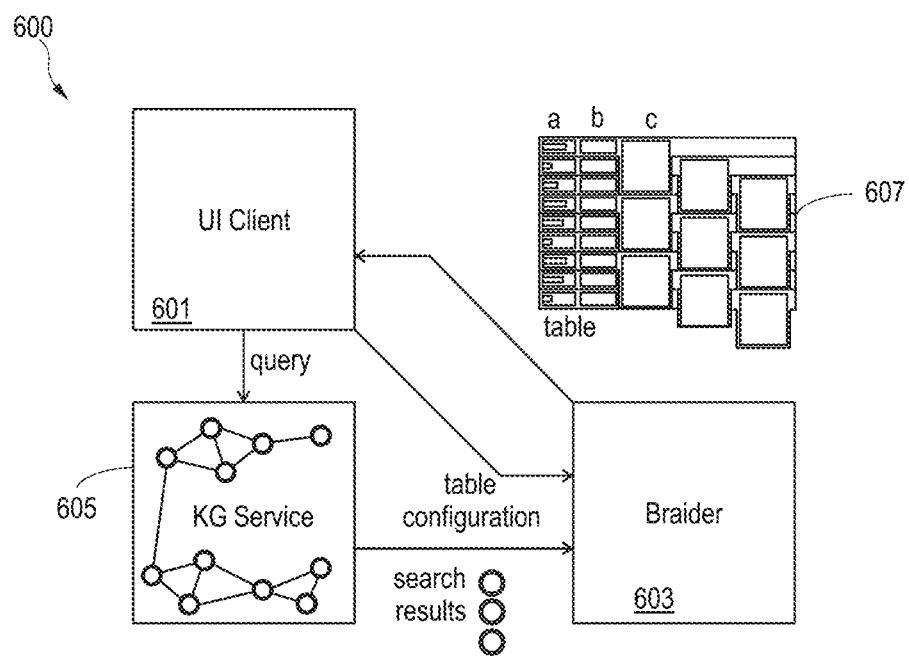
FIG. 6A is a diagram for a computer system in accordance with an example of the present subject matter.
Figure 6B:
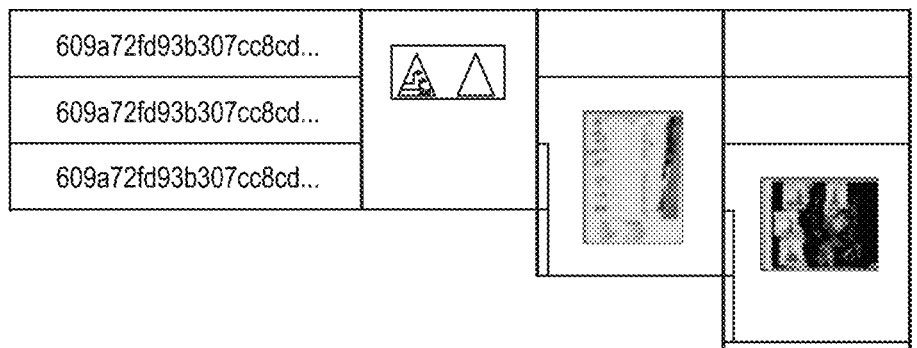
FIG. 6B depicts the displayed table according to an example of the present subject matter.
Figure 7:
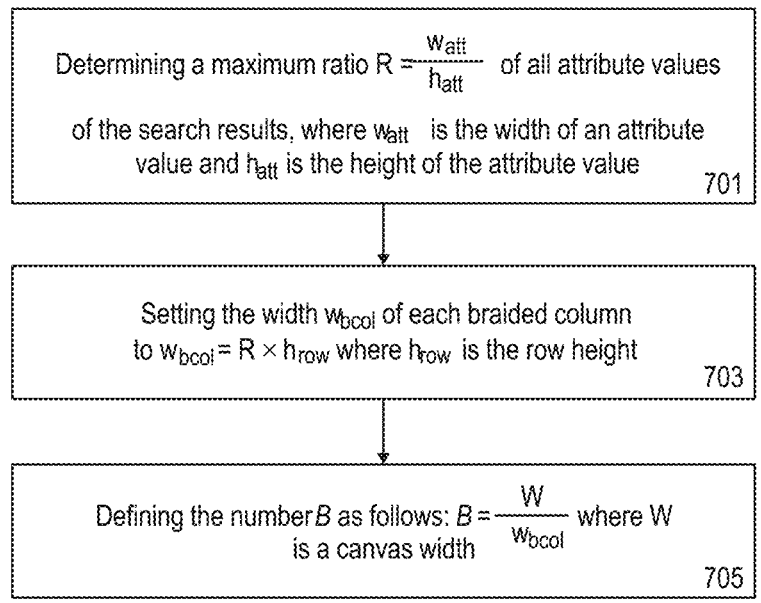
FIG. 7 is a flowchart of a method for configuring braided columns in accordance with an example of the present subject matter.

FIG. 6A is a diagram of a computer system in accordance with an example of the present subject matter. The computer system 600 comprises a (user interface) UI client 601 and a braider 603. The UI client 601 and the braider 603 may be part of a user device. The computer system 600 further comprises a (knowledge graph) KG service 605. As indicated in FIG. 6A, the UI client 601 may query the KG service 605. The search results may be received at the braider 603. The search result may comprise values of two attributes, one indicating the KG's node ID and the other attribute represents a graph. The braider 603 may receive a table configuration or definition which defines the table 607 shown in FIG. 6A. FIG. 7 provides an example of this table configuration. Thus, the braider 603 may receive two inputs, namely ranked KG search result data and table column configurations. The braider 603 may use the table configuration to display the search results in the table 607. The table 607 may be provided as an image, or its definition in a typesetting language such as HTML. The columns are braided according to their configuration and the KG search result data are embedded in the table. An example of the displayed search results is shown in FIG. 6B. In each braided row of the three braided rows shown in FIG. 6B, one regular cell may comprise a node ID and one braided cell may comprise the graph associated with the node.

FIG. 7 is a flowchart of a method for configuring braided columns in accordance with an example of the present subject matter. For the purpose of explanation, the method described in FIG. 7 may be implemented in the system illustrated in FIG. 1 but is not limited to this implementation. The method of FIG. 7 may, for example, be performed by the user device 101. A maximum ratio $$R = \frac{w_{att}}{h_{att}}$$

of all attribute values of the search results may be determined in step 701. The width of an attribute value is represented by $w_{att}$ and $h_{att}$ is the height of the attribute value. The width $w_{bcol}$ of each braided column may be set in step 703 to $w_{bcol}=R \times h_{row}$ where $h_{row}$ is the row height. The number B may be defined in step 705 as follows:

$$B = \frac{W}{w_{bcol}}$$

where W is a canvas width. This method may provide a configuration of the first table (table 212, FIG. 2B).

The present method may allow for more layouts and styles of the second table 222. These make different trade-offs between visual complexity and emphasizing the continuation of the rows along the braids. FIG. 8 depicts an example structure of the second table for separating the braided rows. In particular, a first structure 801 (labelled Corridors) and second structure (labelled Viaducts) 803 show three braided rows of the second table respectively. The two structures may enable a distinction between the braided rows of the second table and thus may reduce the visual complexity of the displayed search results.

Figure 9:
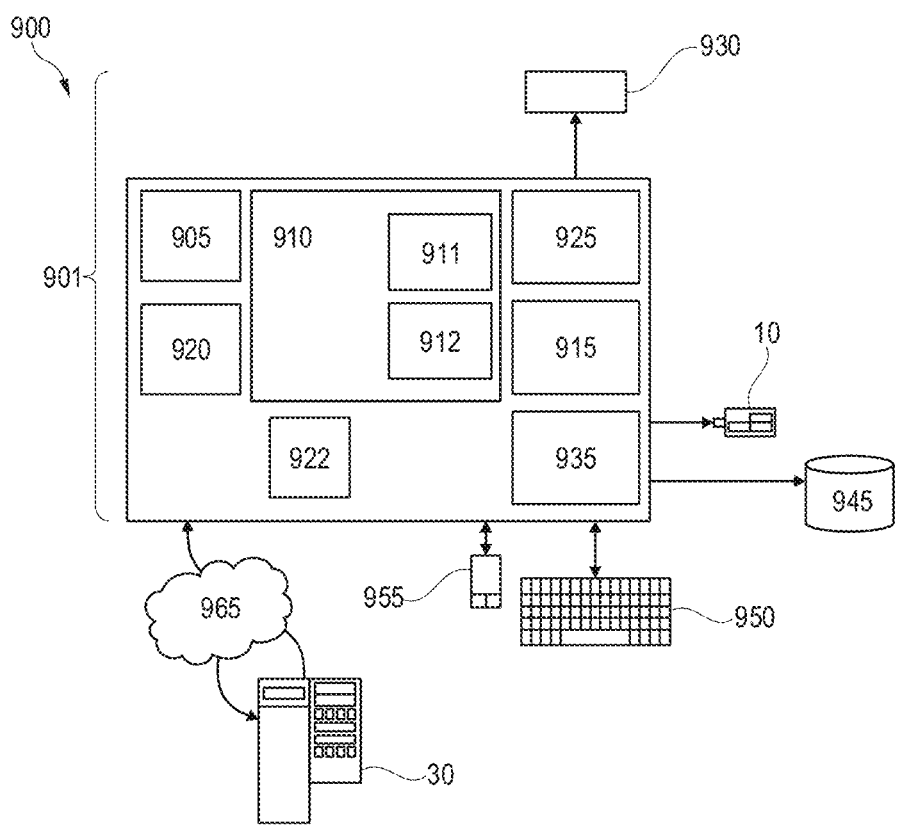
FIG. 9 represents a computerized system, suited for implementing one or more method steps as involved in the present subject matter.

FIG. 9 represents a general computerized system 900 suited for implementing at least part of method steps as involved in the disclosure.

It will be appreciated that the methods described herein are at least partly non-interactive, and automated by way of computerized systems, such as servers or embedded systems. In exemplary embodiments though, the methods described herein can be implemented in a (partly) interactive system. These methods can further be implemented in software 912, 922 (including firmware 922), hardware (processor) 905, or a combination thereof. In exemplary embodiments, the methods described herein are implemented in software, as an executable program, and are executed by a special or general-purpose digital computer, such as a personal computer, workstation, minicomputer, or mainframe computer. The most general system 900 therefore includes a general-purpose computer 901.

In exemplary embodiments, in terms of hardware architecture, as shown in FIG. 9, the computer 901 includes a processor 905, memory (main memory) 910 coupled to a memory controller 915, and one or more input and/or output (I/O) devices (or peripherals) 10, 945 that are communicatively coupled via a local input/output controller 935. The input/output controller 935 can be, but is not limited to, one or more buses or other wired or wireless connections, as is known in the art. The input/output controller 935 may have additional elements, which are omitted for simplicity, such as controllers, buffers (caches), drivers, repeaters, and receivers, to enable communications. Further, the local interface may include address, control, and/or data connections to enable appropriate communications among the aforementioned components. As described herein the I/O devices 10 and 945 may include any generalized cryptographic card or smart card known in the art.

The processor 905 is a hardware device for executing software, particularly that stored in memory 910. The processor 905 can be any custom made or commercially available processor, a central processing unit (CPU), an auxiliary processor among several processors associated with the computer 901, a semiconductor-based microprocessor (in the form of a microchip or chip set), or generally any device for executing software instructions.

The memory 910 can include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), programmable read only memory (PROM). Note that the memory 910 can have a distributed architecture, where various components are situated remote from one another, but can be accessed by the processor 905.

The software in memory 910 may include one or more separate programs, each of which comprises an ordered listing of executable instructions for implementing logical functions, notably functions involved in embodiments of this invention. In the example of FIG. 9, software in the memory 910 includes instructions 912 (e.g., instructions to manage databases such as a database management system).

The software in memory 910 shall also typically include a suitable operating system (OS) 911. The OS 911 essentially controls the execution of other computer programs, such as possibly software 912 for implementing methods as described herein.

The methods described herein may be in the form of a source program, executable program (object code), script, or any other entity comprising a set of instructions 912 to be performed. For the case in which the methods are in the form of a source program, the program needs to be translated via a compiler, assembler, interpreter, or the like, which may or may not be included within the memory 910, so as to operate properly in connection with the OS 911. Furthermore, the methods can be written as an object-oriented programming language, which has classes of data and methods, or a procedure programming language, which has routines, subroutines, and/or functions.

In exemplary embodiments, a conventional keyboard 950 and mouse 955 can be coupled to the input/output controller 935. Other output devices such as the I/O devices 945 may include input devices, for example but not limited to a printer, a scanner, microphone, and the like. Finally, the I/O devices 10, 945 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The I/O devices 10, 945 can be any generalized cryptographic card or smart card known in the art. The system 900 can further include a display controller 925 coupled to a display 930. In exemplary embodiments, the system 900 can further include a network interface for coupling to a network 965. The network 965 can be an IP-based network for communication between the computer 901 and any external server, client and the like via a broadband connection. The network 965 transmits and receives data between the computer 901 and external systems 30, which can be involved to perform part, or all of the steps of the methods discussed herein. In exemplary embodiments, network 965 can be a managed IP network administered by a service provider. The network 965 may be implemented in a wireless fashion, e.g., using wireless protocols and technologies, such as Wi-Fi, WiMAX, etc. The network 965 can also be a packet-switched network such as a local area network, wide area network, metropolitan area network, Internet network, or other similar type of network environment. The network 965 may be a fixed wireless network, a wireless local area network W(LAN), a wireless wide area network (WWAN) a personal area network (PAN), a virtual private network (VPN), intranet or other suitable network system and includes equipment for receiving and transmitting signals.

If the computer 901 is a PC, workstation, intelligent device or the like, the software in the memory 910 may further include a basic input output system (BIOS) 922. The BIOS is a set of essential software routines that initialize and test hardware at start-up, start the OS 911, and support the transfer of data among the hardware devices. The BIOS is stored in ROM so that the BIOS can be executed when the computer 901 is activated.

When the computer 901 is in operation, the processor 905 is configured to execute software 912 stored within the memory 910, to communicate data to and from the memory 910, and to generally control operations of the computer 901 pursuant to the software. The methods described herein and the OS 911, in whole or in part, but typically the latter, are read by the processor 905, possibly buffered within the processor 905, and then executed.

When the systems and methods described herein are implemented in software 912, as is shown in FIG. 9, the methods can be stored on any computer readable medium, such as storage 920, for use by or in connection with any computer related system or method. The storage 920 may comprise a disk storage such as HDD storage.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 10:
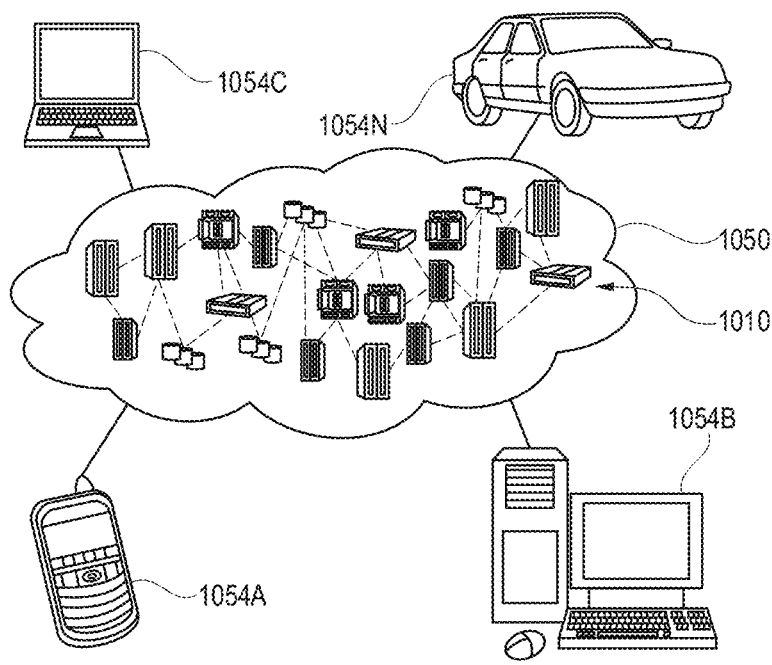
FIG. 10 depicts a cloud computing environment according to an embodiment of the present invention.

Referring now to FIG. 10, illustrative cloud computing environment 1050 is depicted. As shown, cloud computing environment 1050 includes one or more cloud computing nodes 1010 with which local computing devices used by cloud consumers, such as, for example, personal digital assistant (PDA) or cellular telephone 1054A, desktop computer 1054B, laptop computer 1054C, and/or automobile computer system 54N may communicate. Nodes 1010 may communicate with one another. They may be grouped (not shown) physically or virtually, in one or more networks, such as Private, Community, Public, or Hybrid clouds as described hereinabove, or a combination thereof. This allows cloud computing environment 1050 to offer infrastructure, platforms and/or software as services for which a cloud consumer does not need to maintain resources on a local computing device. It is understood that the types of computing devices 1054A-N shown in FIG. 10 are intended to be illustrative only and that computing nodes 1010 and cloud computing environment 1050 can communicate with any type of computerized device over any type of network and/or network addressable connection (e.g., using a web browser).

Figure 11:
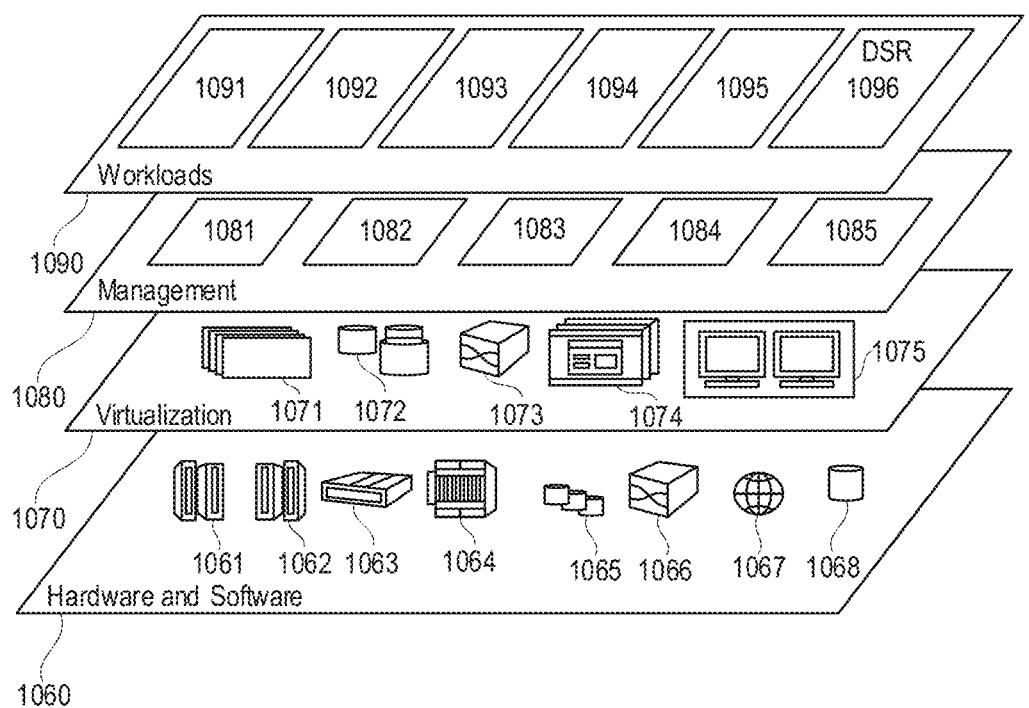
FIG. 11 depicts abstraction model layers according to an embodiment of the present invention.

Referring now to FIG. 11, a set of functional abstraction layers provided by cloud computing environment 1050 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 1060 includes hardware and software components. Examples of hardware components include: mainframes 1061; RISC (Reduced Instruction Set Computer) architecture based servers 1062; servers 1063; blade servers 1064; storage devices 1065; and networks and networking components 1066. In some embodiments, software components include network application server software 1067 and database software 1068.

Virtualization layer 1070 provides an abstraction layer from which the following examples of virtual entities may be provided: virtual servers 1071; virtual storage 1072; virtual networks 1073, including virtual private networks; virtual applications and operating systems 1074; and virtual clients 1075.

In one example, management layer 1080 may provide the functions described below. Resource provisioning 1081 provides dynamic procurement of computing resources and other resources that are utilized to perform tasks within the cloud computing environment. Metering and Pricing 1082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1083 provides access to the cloud computing environment for consumers and system administrators. Service level management 1084 provides cloud computing resource allocation and management such that required service levels are met. Service Level Agreement (SLA) planning and fulfillment 1085 provide pre-arrangement for, and procurement of, cloud computing resources for which a future requirement is anticipated in accordance with an SLA.

Workloads layer 1090 provides examples of functionality for which the cloud computing environment may be utilized. Examples of workloads and functions which may be provided from this layer include: mapping and navigation 1091; software development and lifecycle management 1092; virtual classroom education delivery 1093; data analytics processing 1094; transaction processing 1095; and displaying search results (DSR) 1096 in accordance with the present subject matter (e.g., as described with reference to FIG. 2A, 3A, 4A, 5A, 6A or 7).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for displaying a search result in a user interface the method comprising:
   one or more processors creating a structure to display search results, the structure comprising a sequence of K table rows, a sequence of R regular columns as a first type of column and a sequence of B braided columns as a second type of column, wherein each table row in the sequence of K tables rows corresponds to a separate search result comprising J attribute values, and further wherein K, R, B, and J are positive integer numbers, R is defined based on J, and R regular columns is less than or equal to J−1;
   the one or more processors selecting a row of the sequence of K table rows and a braided column of the sequence of B braided columns for the search result;
   the one or more processors defining in each regular column, regular cells that span the selected row within respective regular columns, and defining a braided cell in the selected braided column that spans the selected row and subsequent B−1 rows; and
   the one or more processors displaying the attribute values of the search result in the defined regular cells that span the selected row and the defined braided cell in the selected braided column, wherein a first attribute type of the attribute values in the defined regular cells is different than a second attribute type of the attribute values in the defined braided cell.

2. The method of claim 1, wherein the search result is an $N^{th}$ search result of a sequence of S search results, and S is less than or equal to K, wherein the selected row is the $N^{th}$ row of the sequence of rows, and the selected braided column is the $x^{th}$ column of the sequence of the braided columns, such that $x=1+((N-1) \bmod B)$, where mod is a modulo operation.

3. The method of claim 2, further comprising:
   the one or more processors displaying in the user interface each additional search result of the sequence of search results.

4. The method of claim 2, further comprising:
   the one or more processors repeating the selecting and the defining for each of the search results of the sequence of S search results and displaying each of the sequence of S search results in respective defined regular cells and braided cells of a corresponding table row, wherein the $N^{th}$ search result of the sequence of S search results is displayed in the regular cells and braided cells of the $N^{th}$ table row.

5. The method of claim 4, further comprising:
the one or more processors displaying around the regular and braided cells of the search result a delimiting line, which is not overlapping with other delimiting lines of the other search results.

6. The method of claim 1, the search result being a first search result of a sequence of S search results, where S≤K, the method further comprising:
the one or more processors displaying each search result of the sequence of S search results in an order of the sequence, wherein the braided column of a current search result has an order $n_0$ in the sequence of the braided columns, where $n_0$ is equal to an order $n_{-1}$ of the braided column of the preceding search result plus one if $n_{-1}$ is less than B, otherwise $n_0=1$.

7. The method of claim 1, for the case in which the selected row is the $n^{th}$ row of the K rows and n is less than or equal to B, the method further comprises:
the one or more processors defining n−1 padding cells, wherein a padding cell is included, respectively in each of the first n−1 rows, and using the padding cell of a given row to display further data on the search result associated with said row.

8. The method of claim 1, further comprising:
the one or more processors defining the braided columns based on determining a maximum ratio of a width to a height of attribute values of the search result;
the one or more processors setting the width of each braided column based on a product of the maximum ratio and a height of the table row;
the one or more processors defining a number of braided columns, B, as a ratio of a user interface display width to the width of the braided columns.

9. The method of claim 7, further comprising defining the braided columns such that the number of braided columns, B, is smaller than a predefined maximum number, and the width of each braided column is smaller than a predefined maximum width.

10. The method of claim 7, further comprising:
the one or more processors accessing the number of braided columns, B, the row height and the width of the braided columns as configuration parameters; and
the one or more processors receiving values for the configuration parameters from a user.

11. The method of claim 1, further comprising:
the one or more processors assigning each attribute value of the search result to a cell of the defined regular and braided cells, wherein the assigning is performed based on at least one of:
a ratio, $$R = \frac{w_{att}}{h_{att}},$$

where $w_{att}$ is the width of an attribute value and $h_{att}$ is the height of the attribute value;
an area covered by the attribute value; and
a type of the attribute value.

12. The method of claim 1, further comprising providing an HTML code, wherein the execution of the HTML code causes the display of the attribute values.

13. The method of claim 1, further comprising:
the one or more processors querying a knowledge graph and receiving the search result.

14. The method of claim 1, further comprising:
the one or more processors determining that the attribute values of the search result include an image and non-image attribute values; and
the one or more processors displaying the image on the braided cell and the non-image attribute values on the regular cells.

15. A computer program product for displaying a search result in a user interface the computer program product comprising:
a computer-readable storage medium including computer-readable program instructions, the computer-readable program instructions comprising:
program instructions to create a structure to display search results, the structure comprising a sequence of K table rows, a sequence of R regular columns as a first type of column and a sequence of B braided columns as a second type of column, wherein each table row in the sequence of K tables rows corresponds to a separate search result comprising values of J attribute values, and further wherein K, R, B, and J are positive integer numbers, R is defined based on J, and R regular columns is less than or equal to J−1;
program instructions to select for the search result a row of the sequence of K table rows and a braided column of the sequence of B braided columns;
program instructions to define in each regular column a regular cell included in the selected row, and defining a braided cell in the selected braided column that includes the selected row and subsequent B−1 rows; and
program instructions to display the attribute values of the search result in the defined regular cells that span the selected row and the defined braided cell in the selected braided column, wherein a first attribute type of the attribute values in the defined regular cells is different than a second attribute type of the attribute values in the defined braided cell.

16. The computer program product of claim 15, wherein the computer-readable program code is provided as a service in a cloud environment.

17. A computer system for displaying a search result in a user interface, the computer system comprising: one or more computer processors; one or more computer-readable storage media, and program instructions stored on the one or more computer-readable storage media, the program instructions comprising:
program instructions to create a structure to display search results, the structure comprising a sequence of K table rows, a sequence of R regular columns as a first type of column and a sequence of B braided columns as a second type of column, wherein each table row in the sequence of K tables rows corresponds to a separate search result comprising values of J attribute values, and further wherein K, R, B, and J are positive integer numbers, R is defined based on J, and R regular columns is less than or equal to J−1;
program instructions to select for the search result a row of the sequence of K table rows and a braided column of the sequence of B braided columns;
program instructions to define in each regular column a regular cell included in the selected row, and defining a braided cell in the selected braided column that includes the selected row and subsequent B−1 rows; and
program instructions to display the attribute values of the search result in the defined regular cells that span the selected row and the defined braided cell in the selected braided column, wherein a first attribute type of the attribute values in the defined regular cells is different than a second attribute type of the attribute values in the defined braided cell.

18. The system of claim 17, the search result being an $N^{th}$ search result of a sequence of S search results, where S≤K, wherein the selected row is the $N^{th}$ row of the sequence of rows, and the selected braided column is the $x^{th}$ column of the sequence of the braided columns, where $x=1+((N-1) \mod B)$, where mod is a modulo operation.

19. The system of claim 17, being further configured for repeating the method for each further search result of the sequence of search results, thereby displaying the search results in the user interface.

20. The system of claim 17, the search result being a first search result of a sequence of S search results, where S≤K, the computer system being further configured for: repeating the method for each further search result of the sequence of search results following the sequence, wherein the braided column of a current search result has an order $n_0$ in the sequence of the braided columns, where $n_0$ is equal to the order $n_{-1}$ of the braided column of the preceding search result plus one if $n_{-1}<B$, otherwise $n_0=1$.

\* \* \* \* \*